United States Patent
Liu (10) Patent No.: US 12,003,501 B1
(45) Date of Patent: *Jun. 4, 2024

(54) MULTIPLE-FACTOR AUTHENTICATION

(71) Applicant: 8x8, Inc., Campbell, CA (US)

(72) Inventor: Zhishen Liu, Campbell, CA (US)

(73) Assignee: 8x8, Inc., Campbell, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/097,385

(22) Filed: Jan. 16, 2023

Related U.S. Application Data (63) Continuation of application No. 17/212,232, filed on Mar. 25, 2021, now Pat. No. 11,558,369, which is a
(Continued)

(51) Int. Cl.
*H04L 9/40* (2022.01)
*H04L 65/1046* (2022.01)
(Continued)

(52) U.S. Cl.
CPC ........ *H04L 63/083* (2013.01); *H04L 65/1046* (2013.01); *H04L 65/1069* (2013.01);
(Continued)

(58) Field of Classification Search
CPC ... H04L 63/083; H04L 65/1046; H04L 67/02; H04L 65/1069; H04L 67/306; H04L 2463/082; H04M 7/0078; H04M 2215/78; H04M 15/56; H04M 15/8207; H04M 7/0024; H04M 2203/6045
See application file for complete search history.

(56) References Cited

U.S. PATENT DOCUMENTS

| | | | |
|---|---|---|---|
| 5,390,232 A * | 2/1995 | Freeman | H04M 3/362 379/244 |
| 6,304,649 B1 * | 10/2001 | Lauzon | H04M 3/465 379/373.02 |

(Continued)

OTHER PUBLICATIONS

USPTO Notice of Allowance dated Jun. 23, 2023, received for U.S. Appl. No. 17/878,571 of the Instant Applicant/Assignee, 9 pages.

*Primary Examiner* — John B King
(74) *Attorney, Agent, or Firm* — Crawford Maunu PLLC (57) ABSTRACT

One example involves a method for providing communications services to remotely-situated client entities, wherein each client entity is associated with users and each user is associated with a communication device. For providing the services verification may be realized by using a first authentication factor for a user among the users, and a communication request may be generated. The generated communication request may include a first portion specifying at least one target endpoint associated with the user and a second portion associated with or indicating the security code and that includes a set of instructions which: are specific to the user, which specify how to communicate the security code for the user, and which specify different security codes for different types of communications. The security code is sent to the user according to the set of instructions, and verified via a second authentication factor associated with or for the user by comparing input from the user to the security code.

21 Claims, 5 Drawing Sheets

Related U.S. Application Data continuation of application No. 16/200,252, filed on Nov. 26, 2018, now Pat. No. 10,965,666, which is a continuation of application No. 15/270,399, filed on Sep. 20, 2016, now Pat. No. 10,142,329.

(60) Provisional application No. 62/353,977, filed on Jun. 23, 2016, provisional application No. 62/353,971, filed on Jun. 23, 2016.

(51) Int. Cl.
    *H04L 65/1069*      (2022.01)
    *H04L 67/02*      (2022.01)
    *H04L 67/306*      (2022.01)
    *H04M 15/00*      (2006.01)
    *H04M 7/00*      (2006.01)

(52) U.S. Cl.
    CPC ............ *H04L 67/02* (2013.01); *H04L 67/306* (2013.01); *H04M 15/56* (2013.01); *H04M 15/8207* (2013.01); *H04L 2463/082* (2013.01); *H04M 7/0024* (2013.01); *H04M 7/0078* (2013.01); *H04M 2203/6045* (2013.01); *H04M 2215/78* (2013.01)

(56) References Cited

U.S. PATENT DOCUMENTS

| | | | | |
|---|---|---|---|---|
| 6,314,402 B1* | 11/2001 | Monaco | ................ | H04M 3/493 704/275 |
| 6,643,362 B2* | 11/2003 | Hogan | ................ | H04M 15/88 379/196 |
| 6,754,224 B1* | 6/2004 | Murphy | .............. | H04L 65/1101 370/261 |
| 6,920,441 B2 | 7/2005 | Zyarko et al. | | |
| 6,922,411 B1 | 7/2005 | Taylor | | |
| 6,985,478 B2 | 1/2006 | Pogossiants et al. | | |
| 8,018,921 B2 | 9/2011 | Pogossiants et al. | | |
| 8,656,417 B2* | 2/2014 | May | ................... | H04L 12/6418 719/328 |
| 8,964,726 B2* | 2/2015 | Lawson | ................ | H04M 15/90 370/352 |
| 9,137,127 B2* | 9/2015 | Nowack | .................. | H04W 4/14 |
| 9,160,696 B2* | 10/2015 | Wilsher | .................. | H04W 4/14 |
| 9,270,833 B2* | 2/2016 | Ballai | .................. | H04W 12/12 |
| 9,294,515 B2* | 3/2016 | Sayko | ................. | H04L 65/1106 |
| 9,338,064 B2* | 5/2016 | Stratton | ................. | G06F 9/5072 |
| 9,344,573 B2* | 5/2016 | Wolthuis | ............. | H04M 3/5175 |
| 9,455,949 B2* | 9/2016 | Lawson | ................ | H04L 61/106 |
| 9,456,008 B2* | 9/2016 | Lawson | ................ | H04L 9/3247 |
| 9,459,925 B2* | 10/2016 | Lawson | ................ | H04L 67/142 |
| 9,459,926 B2* | 10/2016 | Shakirzyanov | ........ | G06F 9/5072 |
| 9,521,210 B2* | 12/2016 | Taylor | ..................... | H04W 4/02 |
| 9,553,755 B2 | 1/2017 | Anisimov et al. | | |
| 10,142,329 B1* | 11/2018 | Liu | ..................... | H04L 65/1046 |
| 2003/0128691 A1* | 7/2003 | Bergman | .......... | H04M 3/42161 370/352 |
| 2005/0036611 A1* | 2/2005 | Seaton | ............... | G06Q 20/4012 380/44 |
| 2005/0095981 A1* | 5/2005 | Benco | ..................... | H04W 4/12 455/3.06 |
| 2005/0164702 A1* | 7/2005 | Carlson | .................. | H04W 76/20 455/432.1 |
| 2008/0095339 A1* | 4/2008 | Elliott | ..................... | H04L 47/70 379/93.01 |
| 2010/0142516 A1* | 6/2010 | Lawson | ............... | H04M 7/0021 370/352 |
| 2011/0119157 A1* | 5/2011 | Sivanathan | ............ | G06Q 20/12 705/26.41 |
| 2011/0216765 A1* | 9/2011 | Karaoguz | ........ | H04N 21/43637 370/409 |
| 2011/0320550 A1* | 12/2011 | Lawson | .................. | H04L 51/04 709/206 |
| 2012/0039452 A1* | 2/2012 | Horn | ..................... | H04M 3/387 379/188 |
| 2012/0208495 A1* | 8/2012 | Lawson | ............... | H04L 12/1446 455/406 |
| 2012/0304245 A1* | 11/2012 | Lawson | .................. | H04L 63/20 709/227 |
| 2013/0072153 A1* | 3/2013 | Lawson | .................. | H04L 63/10 455/410 |
| 2013/0212603 A1* | 8/2013 | Cooke | .................... | G06F 9/542 719/328 |
| 2013/0235731 A1* | 9/2013 | Hadinata | .............. | H04L 43/0852 370/241 |
| 2013/0304929 A1* | 11/2013 | Fahlgren | ............... | H04L 65/103 709/227 |
| 2014/0044123 A1* | 2/2014 | Lawson | ............... | H04L 63/0807 370/352 |
| 2014/0105372 A1* | 4/2014 | Nowack | ................ | H04M 15/84 379/121.01 |
| 2014/0331060 A1* | 11/2014 | Hayton | .................. | G06F 21/32 713/185 |
| 2015/0248553 A1* | 9/2015 | Strand | ..................... | G06F 21/45 726/6 |
| 2017/0188233 A1* | 6/2017 | Gupta | ..................... | H04L 67/53 |
| 2019/0158353 A1* | 5/2019 | Johnson | ................. | G06F 16/95 |

\* cited by examiner

MULTIPLE-FACTOR AUTHENTICATION

OVERVIEW

Aspects of various embodiments are directed to communication and computing services. Voice over Internet Protocol (VoIP) and other telecommunication platforms have allowed individuals to make telephone calls using broadband Internet connections in place of traditional telephone lines. A VoIP endpoint device can use a broadband Internet connection to connect to a VoIP server that is managed by a VoIP service provider. The VoIP server can handle call routing and provide other VoIP services for the VoIP endpoint device.

Computer servers are increasingly being used to provide various services over a network including, but not limited to, VoIP communication services such as VoIP calls, video conferencing, call exchange servers, packet switching, and traffic management as well as non-VoIP services including, but not limited to: website hosting, remote data storage, remote computing services, and virtual computing environments.

SUMMARY

Various example embodiments are directed to issues such as those addressed above and/or others which may become apparent from the following disclosure concerning systems and methods for using VoIP call control for multiple-factor authentication.

Embodiments are directed toward a method comprising: verifying a first authentication factor for a user; identifying at least one target endpoint device for the user; accessing an application program interface (API) to generate a communication request that includes: a first portion specifying the target endpoint device and written in a format of an application program interface (API), and a second portion that includes a set of one or more documents written in a programming language that includes call flow commands for call routing logic of a call control server. The call flow commands include commands specifying how to communicate a security code. The communication request is transmitted to the call control server. An input is received from the user. A second authentication factor is verified for the user by comparing the input to the security code.

The above discussion/summary is not intended to describe each embodiment or every implementation of the present disclosure. The figures and detailed description that follow also exemplify various embodiments.

BRIEF DESCRIPTION OF FIGURES

Various example embodiments may be more completely understood in consideration of the following detailed description in connection with the accompanying drawings, in which.

While various embodiments discussed herein are amenable to modifications and alternative forms, aspects thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods involving providing authentication services using endpoint devices as part of the authentication. In certain implementations, aspects of the present disclosure have been shown to be beneficial when used in the context of providing VoIP communication services. While the disclosure is not necessarily limited to VoIP systems, platforms and/or services, VoIP systems as a PaaS is used in the following discussion to exemplify certain specific advantageous embodiments.

In the following description, various specific details are set forth to describe specific examples presented herein. It should be apparent to one skilled in the art, however, that one or more other examples and/or variations of these examples may be practiced without all the specific details given below. In other instances, well known features have not been described in detail so as not to obscure the description of the examples herein. For ease of illustration, the different diagrams can refer to the same elements, more specific embodiments, or additional instances of the same element. Also, although aspects and features may in some cases be described in individual figures, it will be appreciated that features from one figure or embodiment can be combined with features of another figure or embodiment even when the combination is not explicitly shown or explicitly described as a combination. For ease of explanation, some examples may be primarily described with reference to VoIP communication servers configured to provide VoIP communication services for endpoints of a plurality of different client accounts. It is understood that the various examples may be adapted for use with computer servers configured to provide various other remote services, including, but not limited to: website hosting, remote data storage, remote computing services, virtual computing environments, enterprise communications as a service, virtual contact center, and other services.

Some service providers customize their services for different customers. This might include customizable auto attendants, call routing, call forwarding, voicemail, or other features. For particularly large clients with many different telephone accounts and numbers, implementing and updating these types of customizations can be a significant undertaking. Certain embodiments of the present disclosure are directed toward an interface that allows a client-specific control engine to access and dynamically adjust the manner in which services are provided for the users of a client account, while maintaining the integrity and security of the underlying system providing the services.

According to certain embodiments, a VoIP communication system may be configured to allow a client-specific control engine to dynamically modify and control the call flow and processing at different levels within the system, including (re)routing of incoming calls to and by protocol private branch exchanges (PBXs) or Internet Protocol PBXs (IP PBXs) to provide multiple-factor authentication. Multiple-factor authentication uses two or more different factors to verify the identity of a user. For example, a login and password provided to an authenticating server might be used as a first factor. A second factor could be provided by verifying that the user is in possession of an endpoint device associated with the login and password. The verification might include sending a confirmation code to the endpoint device and requiring that the user provide the confirmation code to the authenticating server. The order that the first and second factors are obtained be varied depending upon the particular solution being used.

According to certain embodiments, the VoIP communication system provides inbound and outbound call routing for one or more PBXs. A PBX is a telephone system that switches calls between enterprise users on local lines while allowing all users to share a certain number of external phone lines. External phone lines are telephone lines that are supported by telephone carriers as being individually addressable within the public switched telephone network (PSTN). For example, a PBX can use extensions to direct calls to many phones after a caller first makes a call to a shared number. As another example, a PBX can provide direct Inward Dialing (DID). DID is a service where a telephone carrier provides a block of telephone numbers that are each routed to a PBX system rather than to individual telephone lines. Using DID, individual phone numbers can be provided to each person or workstation without separate physical lines into the PBX for each possible connection.

According to embodiments, a VoIP system is configured as a Platform as a Service (PaaS) that provides a user with access to, among other things, telephone call routing control, PBX functions, computer telephony integration (CTI), and data analytics. Embodiments of the present disclosure are directed toward an interface that allows users of the PaaS solution to access VoIP telephone capabilities of the underlying system, including its hardware and software components, while maintaining the integrity and security of the underlying system. Particular embodiments are directed toward a PaaS solution that allows for VoIP call flow control to be controlled, while also providing the ability to interface with data sources that are either part of the underlying system or external to the PaaS solution. These features can be used in combination with a multifactor authentication solution, where one of the authentication factors is provided through the VoIP call flow control, messaging services, authorization services, and combinations thereof.

The ability to access the underlying VoIP services, including call routing and call control engines, can provide a platform that is both flexible and simple to implement from the viewpoints of both the VoIP provider and the customers of the VoIP provider. The PaaS solution can be configured to modify and control the call flow and processing at all levels within the system, including (re)routing of incoming calls to different PBXs. When compared to an add-on type service where a call is first handled by a separate PBX, the PaaS solution may offer a number of advantages and additional features including, but not limited to, increased call routing capabilities, scalability, and reduced complexity. For instance, access to PBX functions allows for simple call redirection to extensions or DID numbers provided by the PBX. Moreover, the PaaS solution coordinates and routes calls between multiple PBXs using an initial call routing switch. Calls initially routed to a particular PBX can still be rerouted to a different PBX using the initial call routing switch.

The ability to access the underlying VoIP services, including call routing and call control engines, can provide a platform that is both flexible and simple to implement from the viewpoints of both the VoIP provider and the customers of the VoIP provider. The PaaS solution can be configured to modify and control the call flow and processing at multiple levels within the system, including (re)routing of incoming calls to different Internet Protocol PBXs (IP PBXs). When compared to an add-on type service where a call is first handled by a separate IP PBX, the PaaS solution may offer a number of advantages and additional features including, but not limited to: increased call routing capabilities, scalability, and reduced complexity. For instance, access to IP PBX functions allows for simple call redirection to extensions or DID numbers provided by the IP PBX. Moreover, the PaaS solution coordinates and routes calls between multiple IP PBXs using an initial call routing switch. Calls initially routed to a particular IP PBX can still be rerouted to a different IP PBX using the initial call routing switch.

The VoIP servers providing the underlying function for the PaaS can be configured to utilize a high-level, domain-specific programming language (e.g., VoIP servers providing VoIP call routing and IP PBX functions). A particular example of a VoIP server may use session initiation protocol (SIP) to handle various call functions (e.g., call setup and tear down). However, the various embodiments discussed herein are not necessarily limited thereto. Consistent with the above and in other embodiments disclosed herein, the VoIP servers can be configured to establish a leg of the call from the VoIP endpoint devices (or dial peers) to another VoIP endpoint device or to endpoints on the PSTN through use of a VoIP-PSTN gateway.

According to various embodiments, the high-level, domain-specific programming language(s) is (are) defined using a markup language as the basis for the language structure. More particular embodiments use an eXtensible Markup Language (XML). An XML model defines the constraints on the high-level language, including defining the set of valid commands that can be carried out by the VoIP servers. Within these constraints, a customer can write XML code that self-describes the building blocks used in the customer's particular application. XML also allows for various different data structures to be embedded into the XML document or file. For example, a script written in JavaScript can be embedded as character data that the VoIP servers are configured to identify and execute. Unless otherwise stated, the use of XML in connection with various embodiments does not necessarily limit the corresponding embodiments, such as limiting the embodiments to the use of only an XML-based language(s).

A particular example language is referred to herein as Call Processing eXtensible Markup Language (CPXML). CPXML refers to a call processing language which defines the message exchange protocol between a call control server (e.g., an IntraSwitch with a CPXML Engine) and other sources of information, such as databases, web applications, authentication servers, and servers providing various call-related services. CPXML can allow developers to program call processing logic or service execution logic with both XML building blocks and scripting languages (e.g., JavaScript or Tool Command Language (TCL)). In certain implementations, CPXML allows PaaS customer developers to integrate VoIP call flow (e.g., as provided by a cloud-based VoIP service) with customer (or third party) application servers and databases. In particular, the call flow can include a connection that is used as part of multiple-factor authentication solution, where a telephone call or text message is used for one of the authentication factors.

For ease of discussion, various embodiments are discussed in terms of XML, and more particularly, CPXML. It is understood that each embodiment discussed in this manner is not necessarily limited to XML, CPXML, or variants of XML. The corresponding control data can therefore be provided in documents corresponding to XML, CPXML, or other languages.

According to particular embodiments, a CPXML engine can respond to a call, or other event, by sending requests to a web server and get CPXML documents for processing, thereby operating in a stateless manner that is similar to how an Internet browser, or similar interface, uses Hypertext Markup Language (HTML). The CPXML engine can interpret a received CPXML document to identify CPXML building blocks that are then rendered (executed). Each building block can define logic relating to one or more functions, such as functions for voice, call control, and flow control logic. The CPXML engine may also execute other types of code, such as JavaScript, to create dynamic content (e.g., dynamically generated CPXML) for client-side flow control. Each CPXML document may have URI links to a web server for iterative processing, or it may include query requests for retrieving data from various sources of data. A query could be formatted for consistency with the source of the data (e.g., by using JavaScript Object Notation (JSON) to retrieve data from third party application servers or from the VoIP server provider's cloud database). This information can then be used to drive call flow or call control decisions. As applicable to multiple-factor authentication, the event could be a call initiation request that includes a CPXML document with instructions for carrying out a portion of the authentication. As an example, the CPXML document could specify as security code (or how to obtain a security code) and how to provide the security code to an individual (e.g., what endpoint to call or text message). Once the code is provided to the individual, the individual can use the code to provide one factor of the authentication.

According to various embodiments, the high-level programming language allows a programmer access to the PaaS solution by way of a controlled and limited set of call control operations and functions. The limitations on the operations can be particularly useful for allowing programming control to be placed into the hands of different customers of the provider of the VoIP servers. For example, the provider can update or make other changes to how the VoIP servers are configured without requiring modification to documents written to use the high-level language, which might otherwise be required to account for the changes. Moreover, the VoIP servers and their data can be protected from poor programming decisions (intentional or otherwise) by tightly controlling the extent that the documents provide control of, or access to, the inner workings of the VoIP servers.

In various embodiments, the high-level programming language and the VoIP servers that execute the high-level programming language can be configured to interface with other sources of data and control. This can include, for example, flow control decisions that are based upon code running on the client side or on the server side. As non-limiting examples, a client-side computer system could run code that is written using JavaScript or TCL while a server-side computer system might run code that is written using PHP: Hypertext Preprocessor (PHP), NodeJS, Python, Scala, Ruby, .Net, or other web languages. For example, a customer can write JavaScript applications as part of a website that uses multifactor authentication. The applications can generate a call request that is sent to the VoIP servers. The applications can include, as part of the call requests, XML documents that specify how to implement the multifactor authentication. In some instances, the code can be configured to dynamically modify the XML content of the documents for each call instance (e.g., based upon changes to the contents of a database queried by the code). The dynamic modification might, for instance, allow the use of different security codes for each call instance, different communication solutions (e.g., call or text message), or combinations thereof.

In an example embodiments, a communication system includes a one or more VoIP communication servers configured to provide VoIP communications for endpoint devices of a plurality of client accounts. Endpoint devices connected as part of a particular call can include VoIP-enabled devices (e.g., IP phones, smart phones, tablets, and/or desktop computers with appropriate VoIP software applications) and/or non-VoIP endpoint devices (e.g., plain old telephone service (POTS) telephones and cellular-capable devices). A respective client can have an account that is associated with one or more endpoint devices. Endpoint devices may be associated with a particular client account by registering the endpoint device with a particular client account serviced by the VoIP communication server(s). Registered devices for each client account may be specified in a respective account settings file accessible by the VoIP communication server(s).

In some embodiments, the VoIP communication server(s) may provide VoIP services using various processes and circuits. As one example, the VoIP communication server(s) may provide VoIP services that are response to XML documents for each respective client. The XML documents can, for example, be provided with a request to establish communications with an individual (e.g., through a telephone call or a text message). Consistent with various embodiments, the request may be part of a multifactor-authentication solution that is initiated as part of an online transaction involving a webpage or similar interface.

According to various embodiments, the high-level, domain-specific programming language(s) are defined using a markup language as the basis for the language structure. More particular embodiments use an XML model that defines the constraints on the high-level language, including defining the set of valid commands that can be carried out by the VoIP servers. Unless otherwise stated, the use of XML in connection with various embodiments does not necessarily limit the corresponding embodiments, such as limiting the embodiments to the use of only an XML-based language(s).

Within the system's constraints, a customer can write XML code that self-describes the building blocks used in the customer's particular application. A particular aspect of the call processing XML is that an API can be used to embed XML into communication requests. For example, a representational state transfer-(RESTful) based API may allow clients to initiate calls by generating links (e.g., specifying a URI) and generating HTTP commands for the links (e.g., GET, POST, or PUT). The XML can be embedded in the link so that the XML is provided as part of the HTTP request generated when accessing the link (e.g., in response to selection from within a web browser). The XML is then used by the call control engine when making the requested telephone calls. In particular instances, the XML can be used to communicate information, such as a secret number or code, that is then used as part of a multiple-factor authentication.

Figure 1:
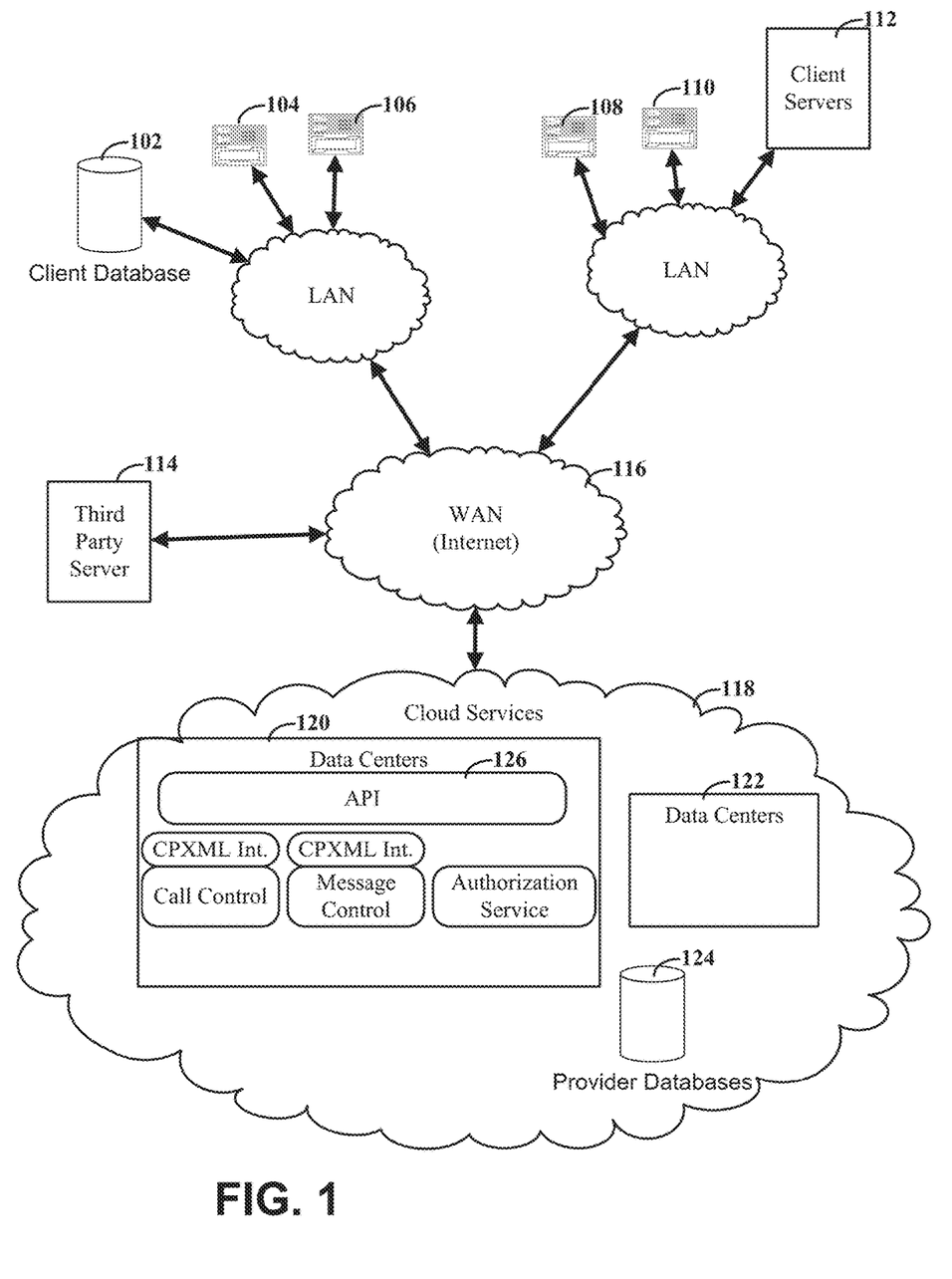
FIG. 1 is a diagram for a VoIP-capable system that uses a high-level programming language for call control operations, consistent with embodiments of the present disclosure.

Turning now to the figures, FIG. 1 is a diagram for a VoIP-capable system that uses a high-level programming language for call control operations, consistent with embodiments of the present disclosure. In connection with these specifically-illustrated examples, VoIP endpoint devices 104, 106, 108, and 110 are configured to place and receive VoIP telephone calls between other VoIP endpoint devices, and also between non-VoIP endpoint devices. Examples of non-VoIP endpoint devices include plain old telephone service (POTS) telephones and cellular-capable devices, which might also be VoIP capable (e.g., smart phones with appropriate VoIP software applications). The various endpoint devices include circuitry that is specially configured to provide calling functions that include interfacing with the appropriate circuitry of the call service provider used by the corresponding endpoint device. In many contexts, a VoIP-endpoint device is a VoIP-capable telephone, commonly referred to as an IP phone. The VoIP-endpoint devices can include, but are not limited to, desktop computers, mobile (smart) phones, laptop computers, and tablets. When each of the endpoint devices originates or receives a call in a telephone network, each can be characterized or referred to as an addressable call endpoint or a dial peer.

The call routing and other services for the VoIP telephone calls can be provided by one or more VoIP servers within the cloud-based system 118 (e.g., configured to provide a PaaS to customers of the VoIP provider). In particular example embodiments, the VoIP servers can be located within one or more data centers 120, 122, which are part of a cloud services system 118. The data centers can be, for example, part of a cloud-based system 118 where the hardware providing the cloud services is located in a number of different data centers with different physical locations. Consistent with embodiments, the cloud services can include services provided by SIP servers, media servers, authorization servers, call control servers, and servers providing other services to both VoIP endpoint devices and the users of the VoIP endpoint devices. In some instances, the various servers, including both the VoIP Servers and data analytic servers discussed herein, can have their functions spread across different physical and logical components. For instance, a cloud-based solution can implement virtual servers that can share common hardware and can be migrated between different underlying hardware. Moreover, separate servers or modules can be configured to work together so that they collectively function as a single unified server.

A particular example of a VoIP server uses session initiation protocol (SIP) to handle various call functions (e.g., call setup and tear down); however, the various embodiments discussed herein are not necessarily limited thereto. Consistent with the above and other embodiments disclosed herein, the VoIP servers can be configured to establish a leg of the call from the VoIP endpoint devices (or dial peers) to another VoIP endpoint device, or to a gateway.

Certain embodiments are directed toward an API server 126 that is configured to allow clients to create webpages or other software that can initiate communications with end-point devices in response to requests received over the Internet 116. In particular embodiments, the API server 126 operates as a RESTful API that allows clients to generate Uniform Resource Identifier (URI) links specifying parameters for a desired communication, such as content for use with multiple-factor authentication. For instance, a client server 112 can be configured to use the API to generate a URI link that can be displayed to an end user. The URI link can contain information that identifies an endpoint device and how the endpoint device is to be contacted (e.g., by telephone call or text message). The API generated URI link sends a communication request to the appropriate service within the data center. For example, the URI link can result in a communication with a call control server in order to initiate a telephone call to an endpoint device or a text message to an endpoint device.

Embodiments of the present disclosure are directed toward an API server 126 that is designed to allow for the insertion of XML code into the URI link and corresponding the requests. The XML code can be used to define how the control servers provide information that is used for multiple-factor authentication. The client servers 112 use the API to generate the URI links and to insert XML code as part of a communication request. The XML code can, for example, indicate what information is communicated to an endpoint device. The information can include a security code, menu options, or other useful information. The XML code can also specify more complex call control options, such as details for implementing a selection menu that is communicated to the called party. For example, the XML code can specify that a menu of options is to be audibly communicated upon a connected call. The XML code can also specify what actions the call control server undertakes in response to receiving menu selections (e.g., selections received using dual-tone multi-frequency signaling (DTMF)).

According to various embodiments, one or more data analytics servers can monitor and analyze call data relating to the VoIP servers and VoIP endpoint devices. For example, a data analytics server may track call statistics about various different call-related parameters, such as: call duration, call date, call time of day, called parties, endpoint devices, selected data centers, selected carriers, dropped calls, transferred calls, voicemail access, conferencing features, and others. The XML can request access to the call summary metrics and the data analytics, which can be stored in a provider database 124. For example, a script running the VoIP server could parse CPXML (control data) documents to generate database queries that direct the VoIP server to query, or subscribe to, call length summaries for all calls made to endpoints that are registered with the VoIP server. The script could then use the information to control how calls are routed as well as how different (customer or provider) services are invoked. According to various embodiments, the database queries could be sent to a client or customer database 102.

In some embodiments, the data analytics server can be used in connection with multiple-factor authentication in order to detect potential fraud. For example, the cloud services 118 can offer a fraud monitor and protection service that can be accessed by parsing the CPXML to generate a corresponding request. In response to a CPXML-generated request, a fraud protection server can access data analytics corresponding to a particular endpoint device, a particular customer, or other parameters specified in the request. The generated request can also specify the nature of the potential fraud. The fraud protection server uses the information in the request to analyze the call summary metrics for fraudulent activity.

For instance, a request may indicate that an analysis be made relative to a multiple-factor authentication process for a website that handles credit card information. The fraud protection server can analyze the call summary metrics to detect an unusual frequency of multiple-factor authentication requests for a particular endpoint device. This might indicate an attacker is attempting to guess the security code in order to bypass one of the authentication factors. It might also indicate that the client server generating the requests has been compromised such that the multiple-factor authentication requests for multiple, different individuals are being improperly routed to an endpoint device of an attacker.

Consistent with certain embodiments, the VoIP server can be configured to interface with client servers 112 or even with third party servers 114. For instance, a CPXML document stored by the cloud-based system 118 can identify, based upon a received call, a URI that points to client servers 112 or to a third party server 114. Data provided from these servers, e.g., in the form of a CPXML document can be used to specify call routing, or other functions. In the context of multiple-factor authentication, the CPXML document can include a URI that points to a secure server that provides the authentication code. The call control server can then request the security code from a server identified by the URI before completing a call to the endpoint device identified in the CPXML document. This can add a layer of additional security because the CPXML document will not contain both the endpoint device identifier and the security code. Thus, an attacker that gains access sufficient to view the contents of the CPXML document will still not be able to correlate a particular user with a particular security code. Further, a request to the security server providing the security code can include information that can be used to identify or verify the endpoint device to be contacted. For example, the security server can access client information that identifies the endpoint device(s) for which active multiple-factor authentications were requested. The security server can then verify that the endpoint device in the request matches the endpoint device identified by the client information. This can help identify a situation where an attacker has modified the CPXML document to contact a different endpoint device, which might be owned by the attacker.

The ability to include CPXML documents within each communication request can be particularly useful for providing a scalable and dynamically-modifiable multiple-factor authentication solution. Placing call routing and call handling instructions directly in the CPXML documents means that the call control servers do not need to be preconfigured with these instructions for each client. Further, a client has the capability to make changes in the communication requests on a request-by-request basis and without the need to update the configuration of the service provider's system.

According to embodiments, the CPXML documents can be dynamically constructed using data that is confidential to the client and therefore not shared with the service provider. As an example, the client server may have access to personal information about the customers being authenticated. This personal information might be part of customer profiles that identify endpoint devices associated with the customers, customer buying history, or a geographic location of the customer. The client server can use the information to customize the CPXML documents for each customer. For example, a particular customer might have multiple associated endpoint devices, a CPXML document could be generated that includes instructions to sequentially call the associated endpoint devices until a successful connection is established with the customer. The CPXML document could specify whether to send audio or text messaging based upon the information. The ability to customize the CPXML documents based upon data accessible by the client server allows for the call control decisions to be decoupled from the data used to make the decisions. In particular, the service provider can carry out the call control decisions specified in the CPXML documents without knowledge of the data used to make the decisions.

Accordingly to embodiments of the present disclosure, the client server creates CPXML documents that specify queries to databases managed by the service provider. In particular implementations, the databases can contain information that is proprietary to the service provider and therefore not directly shared with the client. For example, a CPXML document can use a conditional statement that is premised upon the results of a database query to a database maintained by the service provider. The service provider can implement the query within their system and without the client having access to the data or even the result. The result of the query can be used to determine the appropriate action, as specified in relation to the conditional statement. A conditional statement within the CPXML document can use the result of a query to a database or other data source as the conditional operator. An example functionality for conditional statement is: if a current call quality is less than threshold quality, then a text message should be used to send the multiple-factor authentication, else the default condition is to use a telephone call. Using a query in the conditional statement, the service provider can keep the call quality private, while still allowing a customer to indirectly use the information.

The provided examples are not limiting with respect to the possible uses of (XML) documents in the context of multiple-factor authentication. Additional features and configurations are contemplated and supported by the XML interfaces and the call control engines.

Figure 2:
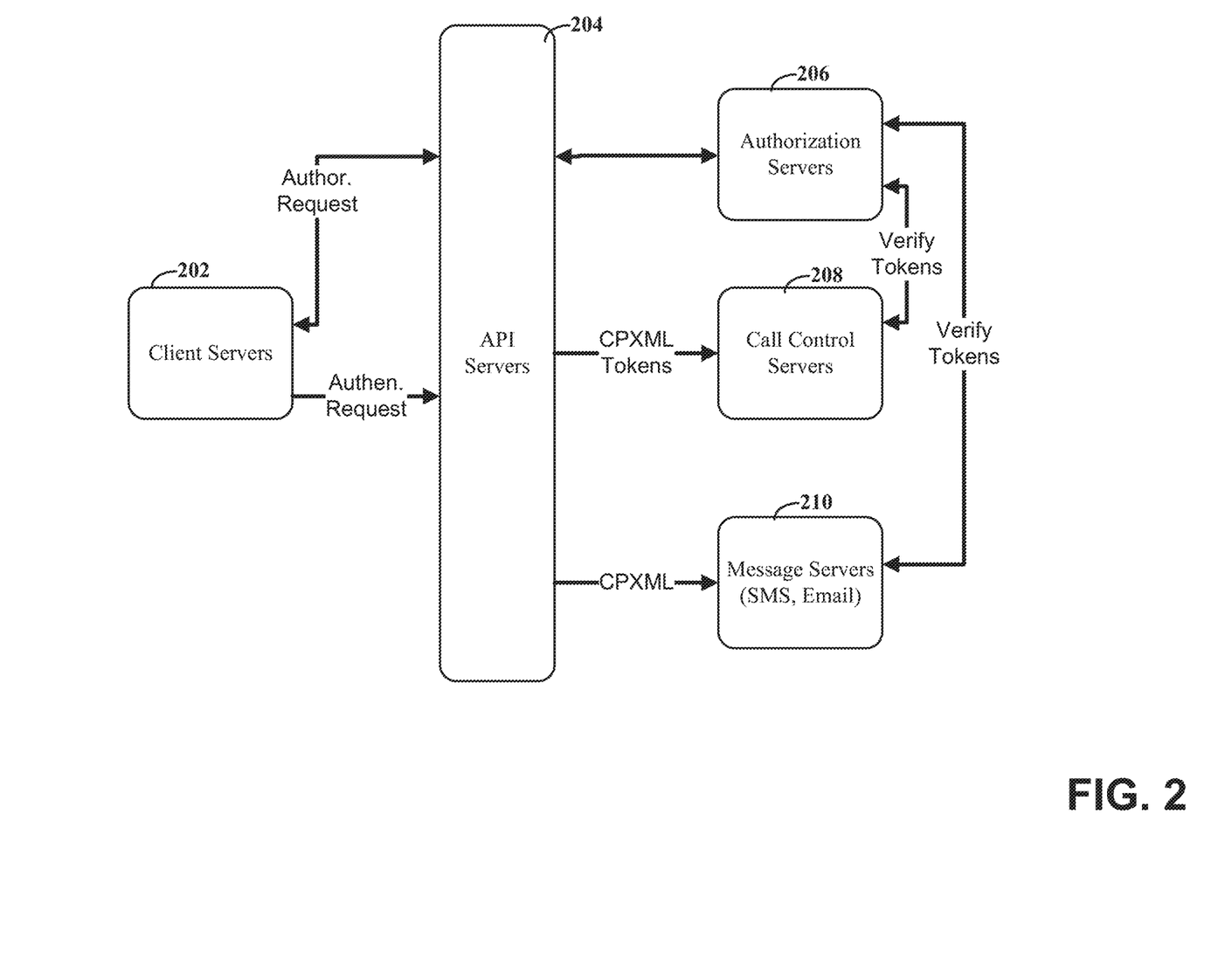
FIG. 2 is a block diagram showing data flow between servers in a system that provides multiple-factor authentication, consistent with embodiments of the present disclosure.

FIG. 2 is a block diagram showing data flow between servers in a system that provides multiple-factor authentication, consistent with embodiments of the present disclosure. One or more API servers 204 allow client servers to use APIs that are designed to provide access to different servers and associated functions. For instance, an API server 204 can be configured to provide API functions that generate requests for authorization of services provided by the service provider. The services can include functions provided by call control servers 208 and message servers 210. Authorization servers 206 can verify that the client server, or a particular user of the client server, has appropriate rights to use the services. As a non-limiting example, the authorization servers 206 could use the OAuth 2.0 protocol.

For instance, a client server can use an API to generate access requests that are sent to the authorization servers 206. The requests identify the desired functions or resources provided by the call control servers 208 and message servers 210. The authorization servers 206 verify that access is proper and then grant access by providing an access token to the client. The access token can specify the limits of the access (e.g., specific scope and duration). The client server can then use the API to generate links that include the access token and that specify at least one of the functions provided by the control servers 208 and message servers 210. The authorization servers 206 can also provide both the control servers 208 and message servers 210 with the token information, which allows the access tokens to be verified.

As a particular example, a website provider can build a website that incorporates API functions provided by the API server 204. The functions can include a multiple-factor solution that involves calling or texting an endpoint device (e.g., a cellular telephone) to confirm that an individual is in possession of the endpoint device. In a particular example, an individual first confirms their identity by providing a user name and password using a web interface (e.g., a web browser displaying the website provider). The website then uses an API provided by the API servers 204 to request authorization rights to a telephone call function provided by call control servers 208 or to a message function provided by message servers 210. The OAuth (or similar) protocol can be used to handle the authorization requests by providing a token to the requestor. The website next uses the API to generate a link to the call control server. For example, the website identifies a contact telephone number to use with multiple-factor authentication of the individual by accessing user profile data for the individual. The API is then used to generate a link that includes a first portion that specifies the token(s) and the contact telephone number. In addition, the API allows the website provider to include a second portion that specifies call flow commands written in CPXML. The call flow commands can, at a minimum, specify how to communicate the security code to the individual upon connection of the call.

If desired, the link can be accessed in response to selection by the individual. For example, the website can display a prompt that notifies the user that they will receive a call at the identified telephone number. When the user selects the prompt, the link information is sent to the call control servers 208. The call control servers 208 will then call the contact telephone number and provide information as specified by the call flow commands. The call control servers 208 might also provide the client servers 202 with a notification of the call status, such as the call being placed, completed, or unanswered. The complexity of the call flow commands can vary, including the use of different combinations of the various call flow aspects discussed herein. The website then waits for the individual to enter information through the web interface. The entered information is compared to the security code in order to confirm that the individual is in possession of the endpoint device called as a result of the link.

Consistent with various embodiments, the service provider has a predetermined response URI for the client server and this URI is used by the authorization servers 206, call control servers 208, and message servers 210. The use of a predetermined response URI can help verify that the source of the request is valid by preventing spoofing of the request source.

Figure 3:
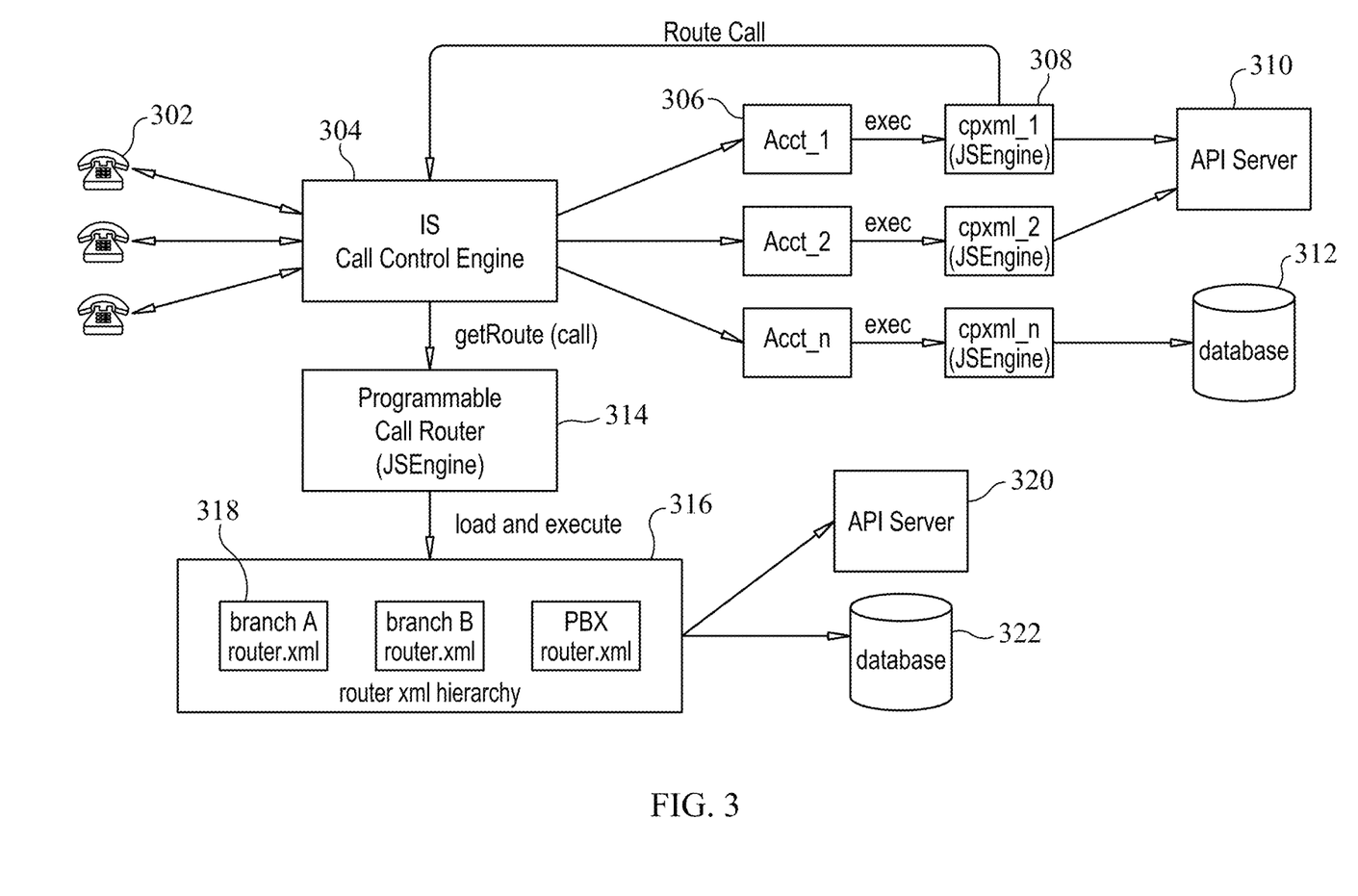
FIG. 3 is a block diagram showing the use of a hierarchy of programmable language documents, consistent with embodiments of the present disclosure.

FIG. 3 is a block diagram showing the use of a hierarchy of programmable language documents, consistent with embodiments of the present disclosure. Call control engine 304 can provide call flow control and routing in a manner that can be consistent with discussions found herein and relating to call control engines, VoIP servers, and the other figures. Consistent with various embodiments, the call control engine 304 is an IP PBX that is part of a VoIP PaaS. The IP PBX can be hosted by a VoIP service provider and located at one or more data centers. Various IP PBX features can be provided for clients and endpoint devices 302, such as call forwarding, remote pickup, call routing, and voice mail. For instance, the IP PBX can be configured using Java-based applications that manage voice over IP (VoIP) networks.

Consistent with various embodiments, customers of a VoIP provider can use the VoIP PaaS by generating documents written in two different XML, languages. A first is the CPXML, while the second can be a call-routing XML (CRXML). Together, the documents specify how the customer would like call intercept to be handled for both inbound and outbound calls. For instance, a CPXML document 308 can be associated with an extension account 306, or with groups of extension accounts. The extension accounts 306 can represent a specific individual and their associated extension number(s). A CPXML document 308 that is configured in this manner will be invoked by the call control engine 304 after an incoming call is routed to an extension that has CPXML capabilities enabled. CPXML documents can also be used for call flow processing of outbound calls. The CPXML document may provide logic for sophisticated call flow functions for outbound calls, including the use of outbound calls for multiple-factor authentication. In addition to telephone calls, other forms of messages (e.g. text messages and email messages) can be automatically generated in response to outgoing calls using commands included in the CPXML document. Restrictions can be placed on outbound calls based upon factors such as time of day or call history. Another CPXML function could be implementation of auto attendants that are each specific to the CRXML-specified routing decision.

The call control engine 304 may also consult with call routers 314. The call routers can be programmed using CRXML documents 318, and with JavaScript for dynamic data access and logic handling. The CRXML documents 318 can be arranged in router xml hierarchy 316, which can specify different CRXML documents 318 depending upon the branch or IP PBX that is identified as corresponding to the call. Once the call router documents are loaded, they can be cached in memory and used by the call control engine 304 to make a routing decision. When a call is routed through the call control engine 304, the call control engine can consult with CRXML documents. The branch level can be identified, for example, based on the branch ID of caller (for outbound calls) or callee (for inbound calls). Delineations other than the branch are also possible, such as by the called country, the particular store, the state, or other factors. If a route result is not determined, the call control engine 304 can also consult with PBX-level CRXML document to obtain routing decisions. Examples of a route result from a script are "Accept," "Reject," or "NewRoute." Using CRXML, the programmable call router module 314 provides the call control engine 304 with the ability to handle call intercept/filter reject or reroute the call to a different target destination.

The call router module 314 can also be configured by a CPXML document to handle sophisticated call flow scenarios where the call routing is changed after the initial determination. For example, the CPXML can include commands (e.g., "Reroute") that the call control engine 304 uses to provide feedback to the programmable call routers 314, which use CRXML for initial routing decisions. This might allow, as an example, a CRXML routing decision to be overridden by the CPXML document(s).

According to particular embodiments, the programmable call routers (using CRXML) 314 can be viewed as plugins to the call control engine 304. The call router plugins may have two levels, Branch and PBX levels. The call router supports CRXML-defined structures that specify how the PaaS can be utilized by a customer. For example, the CRXML can define sets of conditional statements, data access requests, and call routing commands: if/else, condition, goto, log, var, script, query, data, accept, reject, route statements, or other commands. In particular embodiments, CRXML can be considered a subset of CPXML by containing a part, but not all, of the CPXML call flow commands. This distinction can be useful for keeping CRXML documents light weight so that call routing decisions are simplified and efficient. More complex tasks, such as the use of media and advanced call handling, can be handled using CPXML and the larger set of commands. Using such programmable call routes, a few example uses include: school district that generates short message service (SMS) or email notifications to parents whenever an emergency number is dialed; off hour restriction of outbound call with CPXML; call center lockdown to provide outbound dialing restriction for phones; computer initiated dialing with caller identification (ID) override based destination database table, and call return to target DID/agents; and implementation of a call black list (denying calls to/from the list) or white list (allowing calls to/from the list) with potentially large lists and dynamic updating capabilities.

Consistent with embodiments of the present disclosure, both CRXML and CPXML provide the capability of handling dynamic data from multiple sources. Examples of these sources are depicted as application program interface servers 310, 320 and databases 312, 322. The dynamic data can therefore be provided from a variety of sources including, but not necessarily limited to, call route session data (caller id, callee id, or route from/to), query custom object (to a database) in the VoIP provider system/cloud, and access data through HTTP RESTful API. For instance, the XML documents can include a web resource that is identified by URIs. The web resource might be a customer HTTP server that responds to a conditional query (e.g., whether or not a call queue is above a threshold) with CPXML code that instructs the call control engine on how to route, or otherwise handle, the call.

Relative to multiple-factor authentication, the API servers 310 and 320 are used to generate requests to initiate calls, text messages, or emails for the purpose of establishing one of the factors for authentication. The generated requests include XML documents that instruct the call control engine 304 to generate outbound calls for the purpose of providing authentication information. In addition to providing security code information, the XML documents in requests can define call flow control for the call control engine. For example, the XML documents can specify call flow relating to unanswered calls, including calls that go to voicemail. The additional call flow might include, for example, initiating a second call to an alternate endpoint device or using a text message to communicate the security code.

Figure 4:
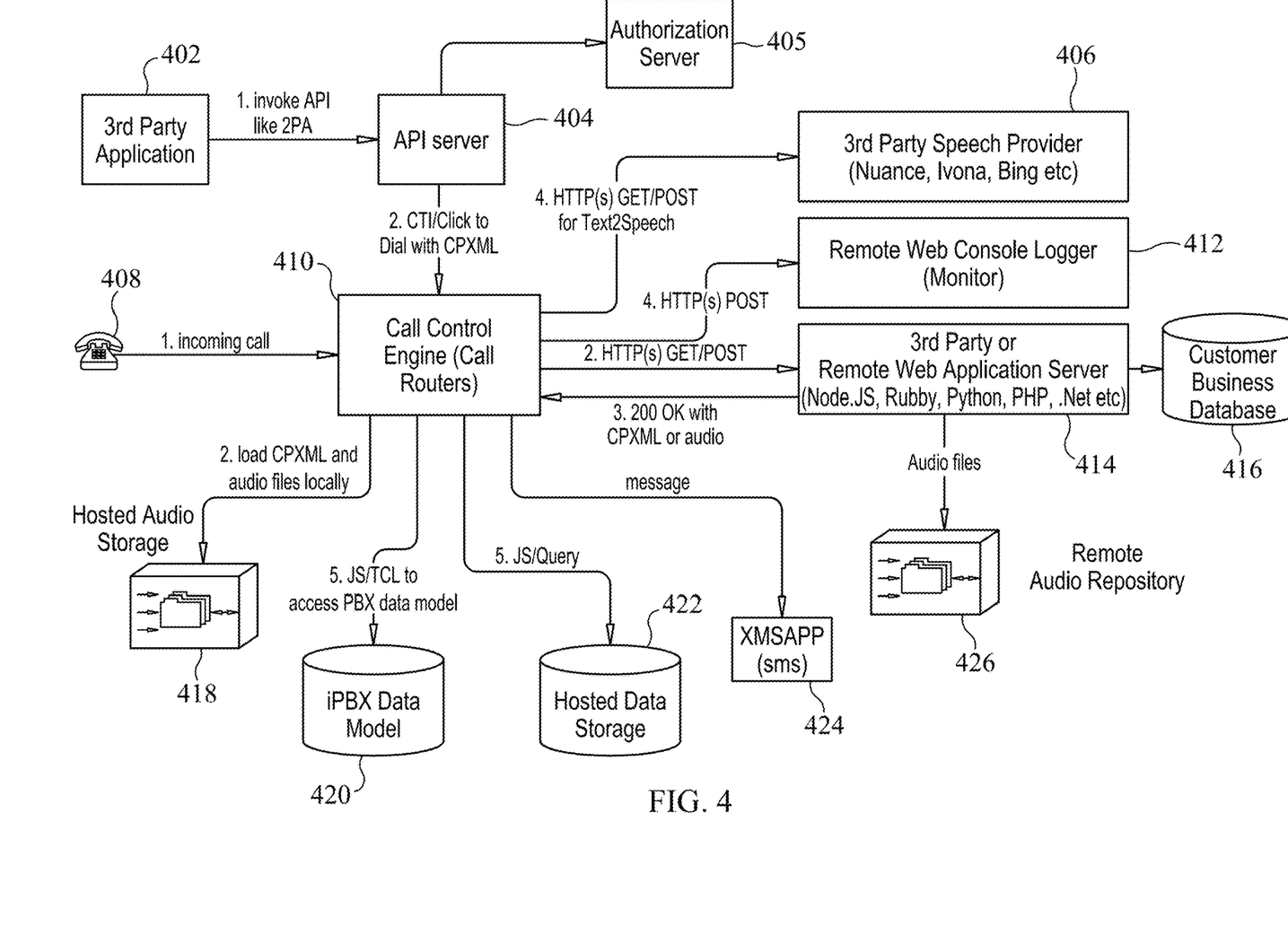
FIG. 4 is a block diagram showing interconnections to a call routing switch, consistent with embodiments of the present disclosure.

FIG. 4 is a block diagram showing interconnections to a call routing switch, consistent with embodiments of the present disclosure. As a particular, non-limiting example, an incoming call, from a telephone device 408, is received by the call control engine 410. The call control engine 410 can use the call destination to invoke a proper VoIP call services (e.g., CTI or a click to dial functionality), which in some instances can be provided by a third party application server 402 using a VoIP provider's API server 404. The CPXML documents can be embedded within the click-to-dial request or CTI service data.

As a particular example, a third party application can use an API provided by API server 404 to contact authorization server 405 for the purpose of obtaining authorization to use certain servers or functions of system. The authorization procedure can include, but is not limited to, the use of access tokens generated consistent with the OAuth protocol. The API server 404 can also provide API functions that allow the third party application to embed CPXML documents into call control requests. For example, the CPXML documents could be embedded in an HTTP request using a text-to-binary format, such as the Base64 format. The CPXML documents can include commands that rely upon the using a variety of different functions offered by the system. This might include a text-to-speech application 406 or the playing of audio files 418 or 426. The CPXML documents might also include queries for information stored in databases 422 or 416.

CPXML documents can also be loaded from a database 422, which might be hosted by the VoIP provider as part of the PaaS solution. CPXML documents can also be retrieved from a customer database 416. For example, the CPXML documents could be retrieved using an HTTP connection to a web application server 414. At the same time that the CPXML documents are retrieved, additional information can also be provided, such as audio files 418, 426. The audio files could be used for various purposes, such as for implementing an auto attendant feature.

In various embodiments, a customer can use databases and other data sources that are offered by the VoIP provider without having direct access to the data. For instance, the customer can use the CPXML to generate queries that identify a data source and a conditional response based upon the query results. The call control engine can carry out the conditional response based upon the results of the query without the customer ever receiving, or otherwise having access to, the data driving the conditional response. A particular example involves a query to a call analytics database for the VoIP provider. A customer could be given the limited, indirect access to the database through CPXML-driven queries, while the VoIP provider maintains control over the proprietary contents of the database. Moreover, the database might contain information about individual callers that would raise privacy concerns.

In some instances, the customer can allow the VoIP provider to indirectly access data sources in response to CPXML-driven queries. For example, the customer can specify, in a CPXML document, a URI that points to a customer-provided server and specifies an associated query. The customer-provided server can execute, for example, a local script that may rely upon customer data. The script can generate a response in the form of a CPXML document. The call control engine can then carry out call routing, or other functions, based upon the response and without ever having direct access to the customer data.

In certain embodiments, the call control engine 410 can provide call processing information to a monitor server 412 (e.g., a remote web consolelogger application). The call control engine 410 can then execute the CPXML documents. In an example implementation, the CPXML document might invoke various other services, such as a text-to-speech application 406. For example, a CPXML document might specify that a string of text be converted to speech using a corresponding command (e.g., "<say> Hello, please hold. </say>"). The CPXML document can also request access to various other data sources, such as IP PBX data model 420 and a hosted data storage 422. Further, the CPXML document can specify that an SMS/MMS (XMS) text message be sent using XMSApp 424 or generate new calls (e.g., for call conferencing or call forking). The provided examples of capabilities using CPXML documents are not limiting.

Figure 5:
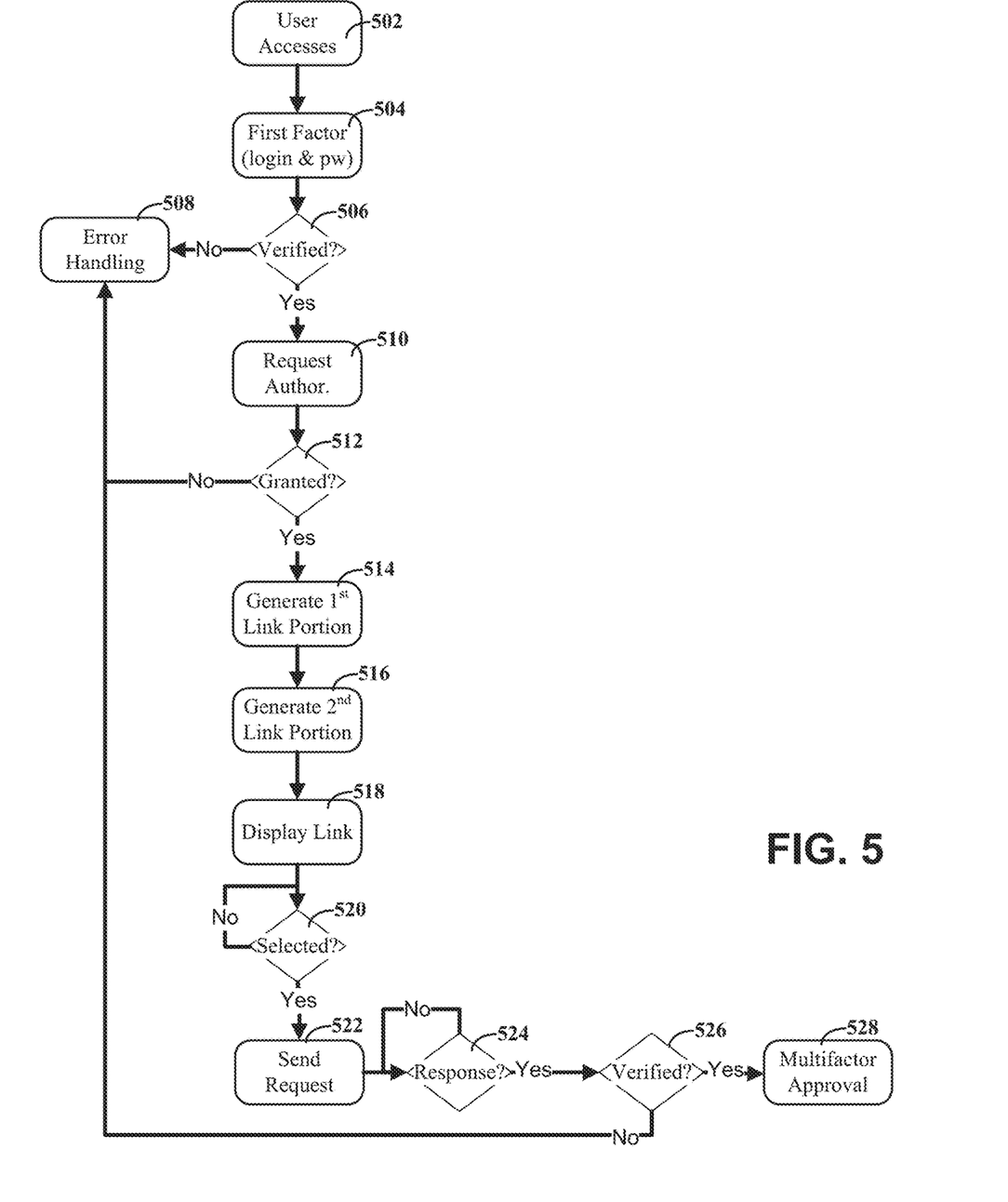
FIG. 5 is a flow diagram for providing multiple factor authentication, consistent with embodiments of the present disclosure.

FIG. 5 is a flow diagram for providing multiple factor authentication, consistent with embodiments of the present disclosure. The flow beings with a user or individual accessing a service provided by a client, per block 502. As an example, a client may host a website that requires authentication of an individual before the client's system performs certain actions or provides access to certain information. The authentication could be linked to a user profile that customizes the web experience and includes private information, such as previously-provided payment information (credit card numbers), health data, contact information, and purchase histories.

As part of an authentication process, the client service prompts the user to complete a first authentication factor, per block 504. As a non-limiting example, the first authentication factor could be a login name and a password. Other authentication factors are also possible. The client system verifies whether the first authentication factor is valid, per block 506. If the verification fails (e.g., the password is incorrect), the client system can provide appropriate error handling, per block 508. The error handling might, for example, prompt the user to re-enter the login and password, while locking the login and password after a threshold number of invalid attempts is exceeded.

In order to implement a second authentication factor, the client system can request authorization to use functions provided by a VoIP-capable system that uses a high-level programming language for call control operations, per block 510. The request can be consistent with the particular authorization procedure of the VoIP-capable system. One example of an authorization procedure is the OAuth protocol, which uses tokens to authorize and verify access rights. Other authorization procedures and protocols can also be used. The client system receives a response that indicates whether or not authorization has been granted, per block 512. If authorization is not granted, the client system provides appropriate error handling, per block 508.

Upon granting of access, the client system generates a service request in the form of a URI link. The URI link includes a first and second portion, per blocks 514 and 516. The call control server can parse the link into the two portions and use the two portions for their respective purposes. Consistent with embodiments discussed herein, the first portion can include information that identifies an endpoint device by telephone number and identifies the contact method (e.g., call or text message) and is used to generate an outgoing telephone call (or other communication). The second portion can include XML code that specifies call/message flow and call/message content and can be used to carry out operations and call flows of varying complexities. For example, the second portion can include commands for playing an audio message that includes a security code (e.g., using a text-to-speech application or by identifying prerecorded audio files). The second portion can also include other logic, such as a menu of options. An audio message can be played to provide the menu options. For example, the audio menu might state: "press one to replay the code, press two to end call, press three to select another language (repeated in several languages), press four to report a fraudulent access attempt, press five to replay the menu." The second portion can include instructions for how the VoIP-capable system is to handle selection of each of the menu options.

In certain embodiments, the URI link is displayed or otherwise provided to the user for selection, per block 518. For a website application, the user might be given a selectable option along with explanation for how the user will be contacted upon selection. For example, the website option could state "Select this option to complete the authentication process using telephone number XXX-3434." In some instances, multiple options could be provided to a user. The options might list different telephone numbers and different contact methods (e.g., telephone call vs. text message). The client system can wait until a selection is made, per block 520.

Upon selection, the client system can send the request to the location specified by the URI link, per block 522. The client system can then wait for a response for the user while the VoIP-capable system contacts the user and provides the security code, per block 524. In some instances, the multiple factor authentication can implement a time out period, after which the security code becomes invalid. Once a user response is provided, in the form of a security code, the response can be verified, per block 526. If the verification passes, then the multiple factor authentication is approved, per block 528. If the verification fails, then error handling can be provided, per block 508.

Various blocks, modules or other circuits may be implemented to carry out one or more of the operations and activities described herein and/or shown in the figures. As examples, the Specification describes and/or illustrates aspects useful for implementing the claimed invention by way of various circuits or circuitry using terms such as blocks, modules, device, system, unit, controller, and the like. In these contexts, a "block" (also sometimes "logic circuitry" or "module") is a circuit that carries out one or more of these or related operations/activities (e.g., a call control circuit). For example, in some of the above-discussed embodiments, one or more modules are discrete logic circuits, computer processing circuits, or programmable logic circuits configured and arranged for implementing these operations/activities, as in the blocks shown in the figures.

Similarly, it will be apparent that a server (e.g., providing a corresponding software platform) includes a computer processor circuit and memory circuit that are configured to provide services to other circuit-based devices. Moreover, a (VoIP) endpoint device (or endpoint) includes a communication circuit (e.g., transceiver circuits for send and receiving audio or other data) and (computer) processor circuits which are configured to establish (VoIP) communication sessions with other endpoint devices (e.g., personal computers, IP-enabled mobile phones, and tablet computers). In certain embodiments, such a processor circuit is one or more computer processor circuits programmed to execute a set (or sets) of instructions (and/or configuration data). The instructions (and/or configuration data) can be in the form of software stored in and accessible from a memory circuit, and where such circuits are directly associated with one or more algorithms (or processes), the activities pertaining to such algorithms are not necessarily limited to the specific flows such as shown in the flow charts illustrated in the figures (e.g., where a circuit is programmed to perform the related steps, functions, operations, activities, etc., the flow charts are merely specific detailed examples). The skilled artisan would also appreciate that different (e.g., first and second) modules can include a combination of a central processing unit (CPU) hardware-based circuitry and a set of computer-executable instructions, in which the first module includes a first CPU hardware circuit with one set of instructions and the second module includes a second CPU hardware circuit with another set of instructions.

Certain embodiments are directed to a computer program product (e.g., nonvolatile memory device), which includes a machine or computer-readable medium having stored thereon, instructions which may be executed by a computer (or other electronic device) that includes a computer processor circuit to perform these operations/activities. For example, these instructions reflect activities or data flows as may be exemplified in figures, flow charts, and the detailed description.

Based upon the above discussion and illustrations, those skilled in the art will readily recognize that various modifications and changes may be made to the various embodiments without strictly following the exemplary embodiments and applications illustrated and described herein. For example, although aspects and features may in some cases be described in individual figures, it will be appreciated that features from one figure can be combined with features of another figure even though the combination is not explicitly shown or explicitly described as a combination. Such modifications do not depart from the true spirit and scope of various aspects of the disclosure, including aspects set forth in the claims.

What is claimed is:

1. An apparatus comprising:
communications circuitry communicatively integrated with computer processing circuitry to:
provide data communications services to a plurality of remotely-situated client entities;
verify a first authentication factor for a user among a plurality of users affiliated with the plurality of remotely-situated client entities;
generate a communication request that includes a first portion specifying at least one target endpoint associated with the user and a second portion associated with or indicating a security code and including a set of instructions which: are specific to the user, which specify how to communicate the security code for the user, and which specify different security codes for different types of communications;
send the security code to the user according to the set of instructions; and
verify a second authentication factor associated with or for the user by comparing input from the user to the security code.

2. The apparatus of claim 1, wherein the set of instructions includes an identifier of the at least one target endpoint, and the data communication services are provided via a cloud-based service by using one or more servers over the Internet.

3. The apparatus of claim 1, wherein the set of instructions includes a command that requests fraud monitoring services based upon or in response to communication summary metrics indicating detection of multi-factor authentication requests for the at least one target endpoint that are greater than a threshold level over a particular period of time.

4. The apparatus of claim 1, wherein the communication request is a Uniform Resource Identifier link, and the at least one target endpoint is enabled to establish communication sessions.

5. The apparatus of claim 1, wherein the set of instructions includes or represents at least one of: audio prompts and menu options provided in response to verifying the first authentication factor; and a conditional statement with a conditional operator that includes a database query to identify the security code.

6. The apparatus of claim 1, wherein the first authentication factor includes a user name and password received through a web interface, wherein the set of instructions include code executable by the computer processing circuitry that is to provide the data communications services.

7. The apparatus of claim 1, wherein the set of instructions specifying how to communicate the security code includes executable code configured to direct the computer processing circuitry, which is linked to circuitry providing the data communications services, on how to communicate the security code to the user.

8. A computer-implemented method comprising:
providing data communications services to a plurality of remotely-situated client entities and verifying a first authentication factor for a user, from among a plurality of users, of the data communications services;
generating a data communication request that relates to the data communications services, that: includes a first portion specifying at least one target endpoint associated with the user, includes a second portion associated with or indicating a security code and further includes a set of instructions which: are specific to the user, specify how to communicate the security code for the user, and specify different security codes for different types of communications;
transmitting the security code to the user according to the set of instructions; and
verifying, via data communications circuitry linked to the data communications services, a second authentication factor associated with or for the user by comparing input from the user to the security code.

9. The method of claim 8, wherein the first authentication factor includes a user name and password received through a web interface, wherein the set of instructions include code executable by computer processing circuitry that is to provide the data communications services, and the at least one target endpoint is enabled to establish communication sessions.

10. The method of claim 8, wherein the data communication request includes a Uniform Resource Identifier link and includes the first portion and the second portion, wherein the first portion and the second portion include executable code and are provided or input by an application programming interface.

11. The method of claim 8, wherein the set of instructions includes or represents at least one of: audio prompts and menu options provided in response to verifying the first authentication factor; and a conditional statement with a conditional operator that includes a database query to identify the security code.

12. The method of claim 8, further including conveying a database query to identify the security code, wherein the database query is for a database maintained by a provider of the data communications services.

13. The method of claim 8, wherein the set of instructions includes an identifier of the at least one target endpoint.

14. The method of claim 8, wherein the data communication services are provided via a service, provided over a broadband communications network, by using one or more servers that are capable of communicating over the Internet.

15. The method of claim 8, wherein the set of instructions includes a command that requests fraud monitoring services in response to communication summary metrics indicating detection of multi-factor authentication requests for the at least one target endpoint that are greater than a threshold level over a particular period of time.

16. The method of claim 8, wherein the set of instructions specifying how to communicate the security code includes executable code configured to direct computer processing circuitry, which is linked to circuitry providing the data communications services, on how to communicate the security code to the user.

17. The method of claim 8, wherein the data communication request is a Uniform Resource Identifier link, and wherein the set of instructions include a command that requests fraud-monitoring services associated with communication summary metrics.

18. The method of claim 8, wherein the first authentication factor includes at least one of a user name and password received through a web interface, and wherein the second portion is embedded in an HTTP request using a text-to-binary format and the method further includes requesting the security code using data in the set of instructions.

19. The method of claim 8, wherein the first portion includes a telephone number, and the second portion includes an identifier directing a communication processing circuit linked to the data communications services to a secure server that provides the security code.

20. A storage device including instructions which, in response to being executed by computer circuitry, cause a method to be performed, the method comprising:

provit data communications services to a plurality of remotely-situated client entities and verifying a first authentication factor for a user, from among a plurality of users, of the data communications services;

generating a data communication request that relates to the data communications services, that includes a first portion specifying at least one target endpoint associated with the user, includes a second portion associated with or indicating a security code and further includes a set of instructions which: are specific to the user, specify how to communicate the security code for the user, and specify different security codes for different types of communications;

transmitting the security code to the user according to the set of instructions; and verifying, via data communications circuitry linked to the data communications services, a second authentication factor associated with or for the user by comparing input from the user to the security code.

21. The storage device of claim 20, wherein the at least one target endpoint includes communications circuitry enabled to establish communication sessions.

* * * * *